(12) United States Patent
Hämäläinen

(10) Patent No.: US 6,434,133 B1
(45) Date of Patent: Aug. 13, 2002

(54) SUBNETWORK DEPENDENT CONVERGENCE PROTOCOL FOR A MOBILE RADIO NETWORK

(75) Inventor: Jari Hämäläinen, Kangasala As (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/181,518

(22) Filed: Oct. 28, 1998

(30) Foreign Application Priority Data

Oct. 30, 1997 (FI) ................................................ 974094

(51) Int. Cl.$^7$ .............................. H04J 3/24; H04Q 7/24

(52) U.S. Cl. ...................... 370/338; 370/349; 370/392; 370/401; 370/466; 370/469; 370/474

(58) Field of Search .................. 370/328, 329, 370/338, 349, 389, 392, 401, 465, 466, 467, 469, 470, 471, 474; 380/269, 270, 28; 455/445, 448, 450, 451, 452, 507, 509, 517, 67.1

(56) References Cited

U.S. PATENT DOCUMENTS

| | | | |
|---|---|---|---|
| 5,257,257 A | 10/1993 | Chen et al. | 370/18 |
| 5,640,395 A | 6/1997 | Hamalainen et al. | 370/322 |
| 5,729,534 A | 3/1998 | Jokinen et al. | 370/284 |
| 5,729,541 A | 3/1998 | Hamalainen et al. | 370/337 |
| 5,790,534 A | 8/1998 | Kokko et al. | 370/335 |
| 5,802,465 A | 9/1998 | Hamalainen et al. | 455/403 |
| 5,978,386 A | * 11/1999 | Hamalainen et al. | 370/466 |
| 6,009,456 A | * 12/1999 | Frew et al. | 709/202 |
| 6,118,775 A | * 9/2000 | Kaari et al. | 370/349 |

FOREIGN PATENT DOCUMENTS

| | | |
|---|---|---|
| EP | 0 584 027 A2 | 2/1994 |
| GB | 2 319 144 A | 5/1998 |
| WO | WO 95/20283 | 7/1995 |
| WO | WO 96/21984 | 7/1996 |
| WO | WO 96/27268 | 9/1996 |
| WO | WO 97/48212 | 12/1997 |
| WO | WO 98/32303 | 7/1998 |
| WO | WO 98/32304 | 7/1998 |

OTHER PUBLICATIONS

PCT International Search Report.

TS 101 297 V6.1.0 Digital cellular telecommunications system (Phase 2+); General Packet Radio Service(GPRS); Mobile Station (MS)—Serving GPRS Support Node (SGSN); Subnetwork Dependent Convergence Protocol (SNDCP) (GSM 04.65 version 6.1.0 Release 1997).

TS 101 351 V6.1.0 Digital cellular telecommunications system (Phase 2+); General Packet Radio Service (GPRS); Mobile Station—Serving GPRS Support Node (MS–SGSN) Logical Link Control (LLC) layer specification (GSM 04.64 version 6.1.0 Release 1997).

(List continued on next page.)

Primary Examiner—Alpus H. Hsu
(74) Attorney, Agent, or Firm—Perman & Green, LLP

(57) ABSTRACT

A method of operating a mobile radio network in which data is assembled into units by a first convergence protocol (SNDCP) layer prior to transmission of the data to a second; peer convergence protocol (SNDCP) layer. Data is provided to the first convergence protocol layer by one of a plurality of convergence protocol layer users (e.g. PDP entities). The method comprises assigning at least one access point identifier (NSAPI) to each user and exchanging between first and second layers one or more set-up messages (XID), each message containing a data compression/decompression algorithm identifier, a set of parameters for the identified algorithm, and a bitmap of access point identifiers, where the bitmap indicates those access point identifiers which are to make use of the identified algorithm and those which are not.

8 Claims, 3 Drawing Sheets

OTHER PUBLICATIONS

TS 03 64 V5.2.0 Digital cellular telecommunication system (Phase 2+); General Packet Radio Service (GPRS); Overall description of the GPRS radio interface; Stage 2 (GSM 03.64 version 5.2.0).

EN 304 344 V6.1.1 Digital cellular telecommunications system (Phase 2+); General Packet Radio Service (GPRS); Service description; Stage 2 (GSM 03.60 version 6.1.1 Release 1997).

Finnish Office Action.

* cited by examiner

SUBNETWORK DEPENDENT CONVERGENCE PROTOCOL FOR A MOBILE RADIO NETWORK

FIELD OF THE INVENTION

The present invention relates to mobile radio subnetwork dependent convergence protocols. The invention is applicable in particular, though not necessarily, to the Subnetwork Dependent Convergence Protocol (SNDCP) to be specified for the General Packet Radio Service (GPRS).

BACKGROUND OF THE INVENTION

Current digital cellular telephone systems such as GSM (Global System for Mobile communications) were designed with an emphasis on voice communications. Data is normally transmitted between a mobile station (MS) and a base station subsystem (BSS) over the air interface using the so called 'circuit switched' transmission mode where a physical channel, i.e. a series of regularly spaced time slots on one or more frequencies, is reserved for the duration of the call. For voice communications, where the stream of information to be transmitted is relatively continuous, the circuit switched transmission mode is reasonably efficient. However, during data calls, e.g, internet access, the data stream is 'bursty' and the long term reservation of a physical channel in the circuit switched mode represents an uneconomic use of the air interface.

Given that the demand for data services with digital cellular telephone systems is increasing rapidly, a new GSM based service known as the General Packet Radio Service (GPRS) is currently being standardised by the European Telecommunications Standards Institute (ETSI) and is defined in overall terms in recommendation GSM 03.60. GPRS provides for the dynamic allocation of physical channels for data transmission. That is to say that a physical channel is allocated to a particular MS to BSS link only when there is data to be transmitted. The unnecessary reservation of physical channels when there is no data to be transmitted is avoided.

GPRS is intended to operate in conjunction with conventional GSM circuit switched transmission to efficiently use the air interface for both data and voice communications. GPRS will therefore use the basic channel structure defined for GSM. In GSM, a given frequency band is divided in the time domain into a succession of frames, known as TDMA (Time Division Multiple Access) frames. The length of a TDMA frame is 4.615 ms. Each TDMA frame is in turn divided into eight consecutive slots of equal duration. In the conventional circuit switched transmission mode, when a call is initiated, a physical channel is defined for that call by reserving a given time slot (1 to 8) in each of a succession of TDMA frames. Physical channels are similarly defined for conveying signalling information.

With the introduction of GPRS, a "traffic channel" for transmitting data is created by dynamically assigning physical channels for either switched circuit transmission mode or for packet switched transmission mode. When the network requirement for switched circuit transmission mode is high, a large number of physical channels may be reserved for that mode. On the other hand, when demand for GPRS transmission is high, a large number of physical channels may be reserved for that mode. In addition, a high speed packet switched transmission channel may be provided by assigning two or more slots in each of a succession of TDMA frames to a single MS.

The GPRS radio interface for GSM Phase 2+ (GSM 03.64) can be modelled as a hierarchy of logical layers with specific functions as shown in FIG. 1, where the mobile station (MS) and the network have identical layers which communicate via the MS/network interface Um. It will be understood that the model of FIG. 1 does not necessarily represent the hardware contained in the MS and the network, but rather illustrates the flow and processing of data through the system. Each layer formats data received from the neighbouring layer, with received data passing from the bottom to the top layer and data for transmission passing from the top to the bottom layer.

At the top layer in the MS are a number of packet data protocol (PDP) entities. Certain of these PDP entities use point-to-point protocols (PTPs) adapted for sending packet data from one MS to another MS, or from one MS to a fixed terminal. Examples of PTP protocols are IP (Internet Protocol) and X.25 which are capable of interfacing with user applications (not shown in FIG. 1). It is noted that two or more of the PDP entities may use the same PDP. Also on the top layer are other GPRS end point protocols entities such as SMS and signalling (L3M). A similar arrangement exists within the network and in particular at the Serving GPRS Support Node (SGSN).

Certain of the top layer entities use a common Subnetwork Dependent Convergence Protocol (SNDCP)—GSM 04.65—which, as its name suggests, translates (or 'converges') the different SNDCP user data into a common form (SNDCP protocol data units) suitable for further processing in a transparent way. SNDCP units are up to 1600 octets and comprise an address field which contains a network service access point identifier (NSAPI) which identifies the endpoint connection, i.e. the SNDCP user. Each MS may be assigned a set of NSAPIs independently of the other MSs. This architecture means that new PDPs and relays may be developed in the future which can be readily incorporated into the existing GPRS architecture.

Each SNDCP (or other GPRS end point protocol) unit is carried by one logical link control (LLC) frame over the radio interface. The LLC frames are formulated in the LLC layer (GSM 04.64) and include a header frame with numbering and temporary addressing fields, a variable length information field, and a frame check sequence. More particularly, the addressing fields include a service access point identifier (SAPI) which is used to identify a specific connection endpoint (and its relative priority and Quality of Service (QoS)) on the network side and the user side of the LLC interface. One connection endpoint is the SNDCP. Other endpoints include the short message service (SMS) and management layer (L3M). The LLC layer formats data received from these different endpoint protocols. SAPIs are allocated permanently and are common to all MSs.

The Radio Link Control (RLC) layer defines amongst other things the procedures for segmenting and re-assembling Logical Link Control layer PDUs (LLC-PDU) into RLC Data Blocks, and for retransmission of unsuccessfully delivered RLC blocks. The Medium Access Control (MAC) layer operates above the Phys. Link layer (see below) and defines the procedures that enable multiple MSs to share a common transmission medium. The MAC function arbitrates between multiple MSs attempting to transmit simultaneously and provides collision avoidance, detection and recovery procedures.

The physical link layer (Phys. Link) provides a physical channel between the MS and the network). The physical RF layer (Phys. RF) specifies amongst other things the carrier frequencies and GSM radio channel structures, modulation of the GSM channels, and transmitter/receiver characteristics.

When a MS becomes active in a network, it is necessary to define exactly how data is to be processed at each of the layers described above. This process also involves conducting preliminary negotiations between the MS and the network. In particular, control parameters known as SNDCP exchange identity (XID) parameters are exchanged between the two peer SNDCP layers, via the respective LLC layers, in an XID parameter negotiation stage. Initialisation of XID negotiation may occur at either the MS or the network. Upon receipt of an XID parameter, the peer entity either configures itself according to that parameter or carries out a further negotiation with the user entity. The field format for the SNDCP XID parameters is as follows:

| bit | 8 | 7 | 6 | 5 | 4 | 3 | 2 | 1 |
|---|---|---|---|---|---|---|---|---|
| octet 1 | | | | Parameter Type | | | | |
| octet 2 | | | | Length = n − 1 | | | | |
| octet 3 | | | | High-order octet | | | | |
| .... | | | | .... | | | | |
| octet n | | | | Low-order octet | | | | |

FIG. 2 considers in more detail the SNDCP layer and its interfaces to the SNDCP users and the LLC layer, and is applicable to both the MS and the SGSN architectures. In particular, FIG. 2 illustrates the compression of protocol and/or user data which is optionally carried out in the SNDCP layer (as is described in GSM recommendation 04.65). Data is first compressed, and is then sub-divided into blocks before the SNDCP header is added and the SNDCP unit assembled. It will be understood that FIG. 2 applies to the preparation of data for transmission. Received data is processed by an analogous reverse decompression.

In the present GSM 04.65 recommendation, several different compression algorithms may be provided for the compression of protocol data, whilst only a single compression algorithm is specifically considered for compression of user data (although provision is made for future developments in which several different user data compression algorithms are made available). Typically, the decision over whether to use compression is made by the user interface application which generates the user data supplied to the SNDCP layer via one of the SNDCP users. The decision is notified to the SNDCP layer. However, compression can only be used providing that this is available at both peer SNDCP layers.

During the SNDCP XID parameter negotiations, one or more protocol compression/decompression entities may be defined, and identified to the two peer SNDCP layers, by the exchange of XID parameters. Similarly, a user data compression/decompression entity (or several such entities) may be defined by the exchange of other XID parameters. GSM recommendation 04.65 proposes the following XID message for this purpose:

| bit | 8 | 7 | 6 | 5 | 4 | 3 | 2 | 1 |
|---|---|---|---|---|---|---|---|---|
| octet 1 | | | | Algorithm | | | | |
| octet 2 | | | | Length = n − 1 | | | | |
| octet 3 | | | | High-order octet | | | | |
| .... | | | | .... | | | | |
| octet n | | | | Low-order octet | | | | |

Octet 1 identifies a particular algorithm, whilst octet 2 identifies the number of octets to follow in the XID message. These following octets define parameters of the chosen algorithm such as the length of a codebook to be used or the length of the codeword to be used in a codebook (see below).

As has already been described, PDP context data is assembled in the SNDCP layer into SNDCP units. The SNDCP layer attaches to each unit a PCOMP (Protocol control information COMPression) tag which identifies whether or not the protocol data contained within that unit has been compressed and, if so, the compression algorithm used. Similarly, a DCOMP (Data COMPression) tag is attached to identify whether or not the user data has been compressed and, if so, which algorithm was used. Upon receipt of each unit, the receiving SNDCP layer can determine whether or not the PDP context data needs to be decompressed and, if so, what decompression algorithms need to be used, before routing the data to the appropriate entity (identified by the NSAPI contained in the received SNDCP unit).

Compression algorithms suitable for compressing data (both protocol and user data) in the SNDCP layer include algorithms which rely upon the creation of a codebook in which a set of codes are identified by respective vectors. For each data segment, the codebook is searched to find the best matching code. The vector is then transmitted to the peer entity which contains an identical codebook which is searched, using the vector, to recover the original code. In order to optimise the efficiency of the compression process for the data to be compressed, the codebook is dynamically updated using the received data. Where the same compression algorithm is used by two or more PDP entities, these entities share the same codebook.

SUMMARY OF THE INVENTION

The present invention stems, at least in part, from the realisation that a shared codebook is unlikely to be optimal for any one PDP context which makes use of a shared codebook. It is therefore an object of the present invention to provide a subnetwork dependent convergence protocol in which different PDP contexts can use the same compression algorithm whilst using different codebooks.

Whilst the above discussion of GPRS has been concerned with GSM, it is noted that GPRS has a much wider applicability. For example, by changing only the low level radio protocol, GPRS may be adapted to the proposed third generation standard UMTS (Universal Mobile Telecommunication System).

According to a first aspect of the present invention there is provided a method of operating a mobile radio network in which data is assembled into units by a first convergence protocol layer prior to transmission of the data to a second, peer convergence protocol layer, said data being provided to the first convergence protocol layer by one of a plurality of convergence protocol layer users, the method comprising:

assigning at least one access point identifier to each user; and exchanging between said first and second layers one or more compression control message, each message containing a data compression/decompression algorithm identifier, a set of parameters for the identified algorithm, and identification of at least one access point identifier which is to make use of the identified algorithm.

Typically, said units of data contain one of said access point identifiers to enable the receiving convergence protocol layer to direct the data contained in the unit to the correct user. Where the convergence protocol layers use compression/decompression algorithms which make use of codebooks, this allows separate codebooks to be created and used for separate access point identifiers even where these identifiers use the same compression/decompression algorithm.

Preferably, said compression control message contains a bitmap of said access point identifiers, where the bitmap indicates those access point identifiers which are to make use of the identified algorithm and those which are not.

Preferably, each of said messages comprise a first octet identifying the compression/decompression algorithm, at least one octet containing a bitmap of said access point identifiers, and a plurality of octets containing respective algorithm parameters. More preferably, said bitmap is contained in two octets.

Preferably, the method of the present invention forms part of a General Packet Radio Service, and said first and second convergence protocol layers are Subnetwork Dependent Convergence Protocol (SNDCP) layers in a mobile station and in a network. In this case, said set-up messages are in the form of exchange identity (XID) messages and said access point identifiers are NSAPIs.

The present invention is also applicable to other packet radio services which make use of a convergence protocol layer.

According to a second aspect of the present invention there is provided a mobile radio device arranged to use the method of the above first aspect of the present invention.

According to a second aspect of the present invention there is provided a serving GPRS support node of a cellular radio network arranged to use the method of the above first aspect of the present invention.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

As has been described above, the present ETSI recommendation for implementing the SNDCP layer in GPRS allows a number of compression/decompression algorithms to be defined for both protocol and user data. Each algorithm is negotiated between two peer SNDCP layers (one in the MS and the other in the network) prior to the compression and transmission of SNDCP units containing this data. When an SNDCP unit is transmitted, PCOMP and DCOMP tags are included in the unit to identify to the receiving layer whether or not packet data and or user data contained in the unit is compressed, and if so, which algorithms have been used.

It is proposed here to include in the XID message used to negotiate an algorithm, a bitmap identifying which NSAPIs are to use that algorithm. In the current ETSI proposal, 16 NSAPIs can be assigned to a MS. Thus, two extra octets are added to the XID message, where the position of a bit (0 to 15) identifies the NSAPI (1 to 16), a 1 indicates that an NSAPI will use the algorithm, and a 0 indicates that an NSAPI will not use the algorithm. The new XID message is as follows:

| bit | 8 | 7 | 6 | 5 | 4 | 3 | 2 | 1 |
|---|---|---|---|---|---|---|---|---|
| octet 1 | | | | Algorithm Type | | | | |
| octet 2 | | | | Length = n − 1 | | | | |
| octet 3 | | | | Applicable NSAPIs (bitmap) | | | | |
| .... | | | | Applicable NSAPIs (bitmap) | | | | |
| .... | | | | High-order octet | | | | |
| .... | | | | .... | | | | |
| octet n | | | | Low-order octet | | | | |

Once an algorithm has been negotiated between the two peer SNDCP layers, it is possible to create several different compression/decompression codebooks for that one algorithm, each codebook being assigned to a respective NSAPI. Thus, it is possible to optimise the compression/decompression process for different NSAPIs, i.e. for different SNDCP users. In some cases, a single codebook may still be shared between several NSAPIs using the same algorithm. This may be appropriate, for example, where two end users share the same PDP and are thus likely to generate similar data for which a common codebook is suitable.

When an SNDCP unit is received by an SNDCP layer, the compression algorithms used (if any) are identified from the PCOMP and DCOMP tags. The codebook, to be used for decompression with the identified algorithm, can then be identified from the NSAPI contained in the unit (as described above).

Figure 1:
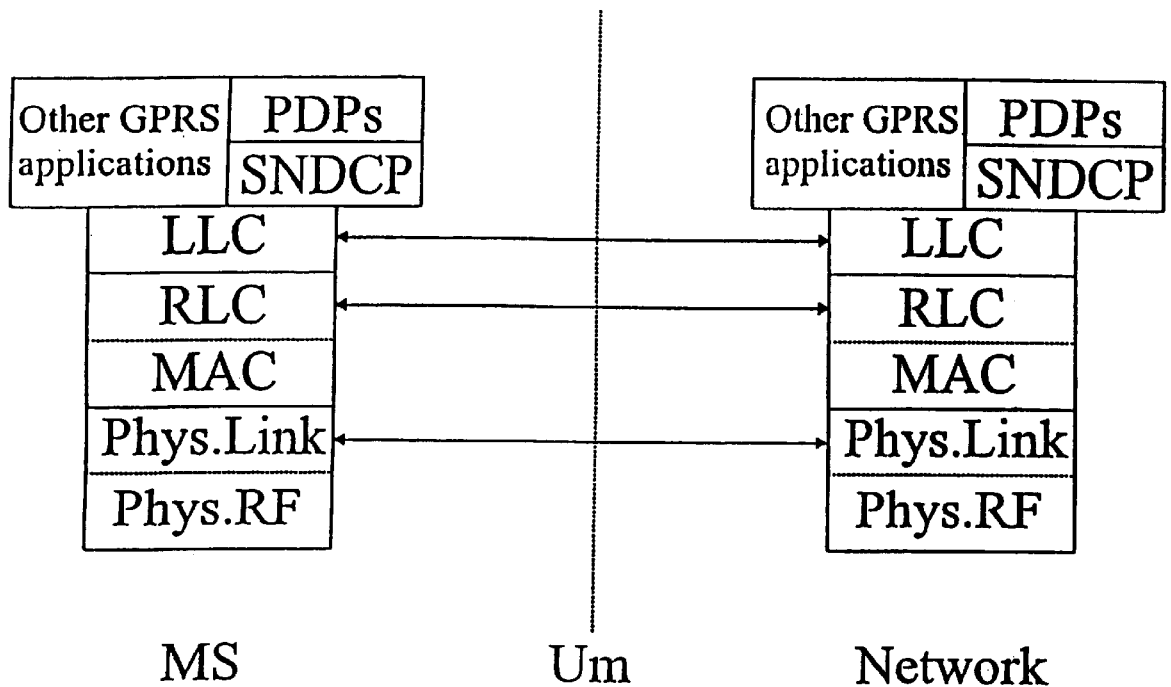
FIG. 1 illustrates the protocol layers of a GPRS radio link.
Figure 2:
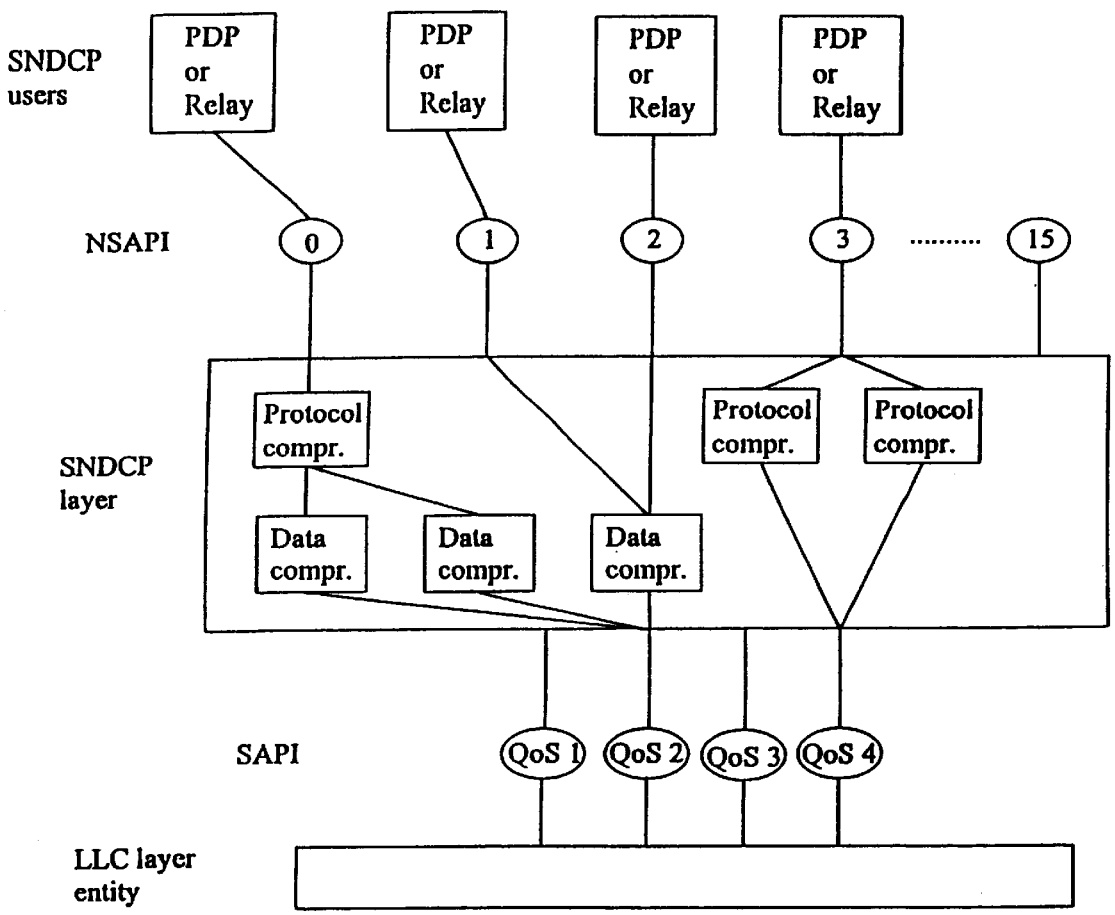
FIG. 2 illustrates in more detail the upper layers of the protocol of FIG. 1.
Figure 3:
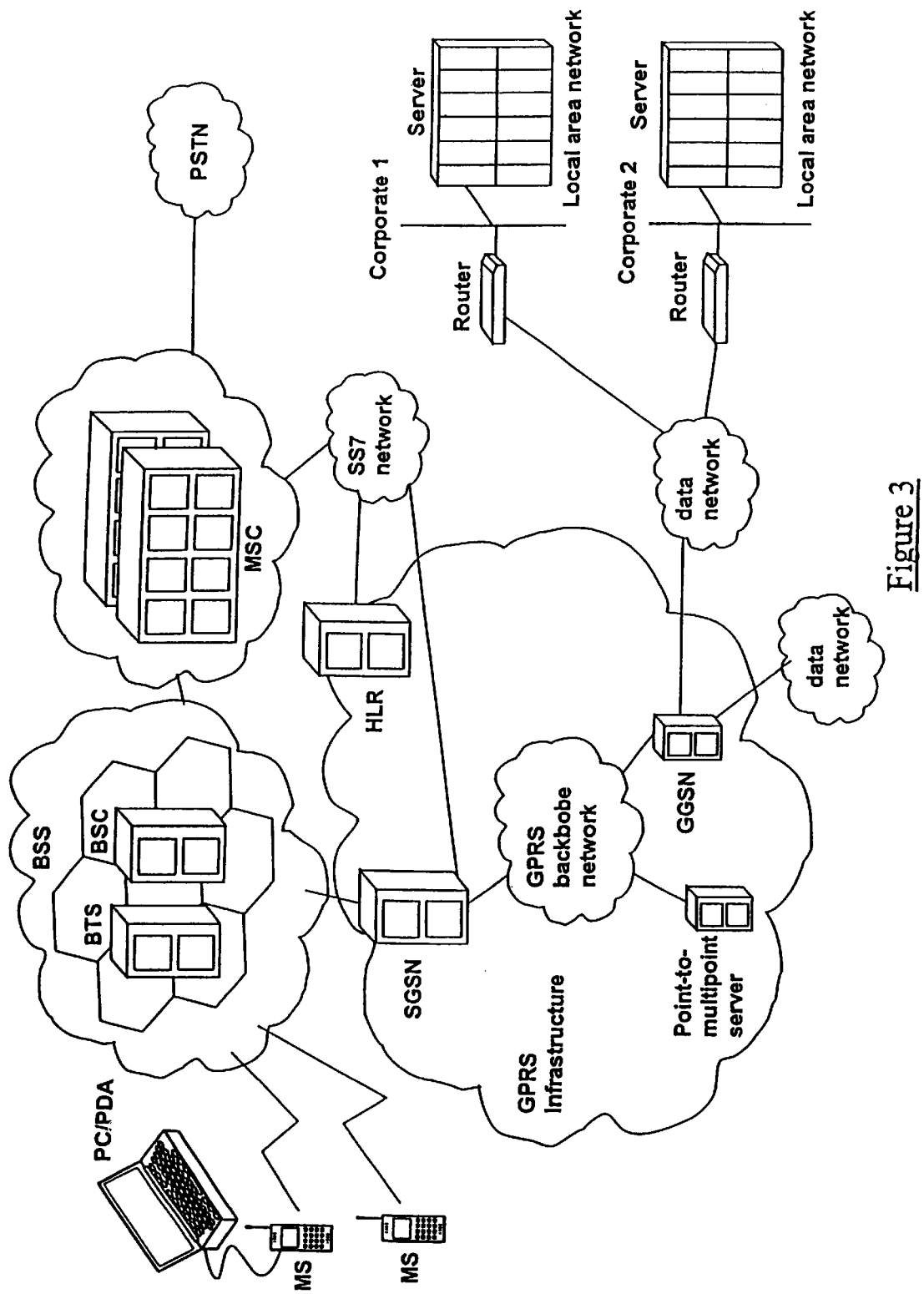
FIG. 3 shows schematically the architecture of a GSM/GPRS digital cellular telephone network.

The general structure of a GSM/GPRS radio telephone network is illustrated in FIG. 3, where the following acronyms are used.

| | |
|---|---|
| BSC | Base Station Controller |
| BSS | Base Station Subsystem |
| BTS | Base Transceiver Station |
| GGSN | Gateway GPRS Support Node |
| GPRS | General Packet Radio Service |
| GSM | Global System for Mobile Communications |
| HLR | Home Location Register |
| IP | Internet Protocol |
| L3M | Layer 3 Management |
| LLC | Logical Link Control |
| MAC | Medium Access Control |
| MS | Mobile Station |
| MSC | Mobile Switching Centre |
| NSAPI | Network Service Access Point Identifier |
| PC/PDA | Personal Computer/Personal Data Assistant |
| PDP | Packet Data Protocol |
| PDU | Packet Data Unit |
| PSTN | Public-Switched Telephone Network |
| PTM-G | Point-To-Multipoint Group |
| PTM-M | Point-To-Multipoint Multicast |
| PTP | Point-To-Point |
| RLC | Radio Link Control |
| SAPI | Service Access Point Identifier |
| SGSN | Serving GPRS Support Node |
| SMS | Short Message Service |
| SNDCP | Subnetwork Dependent Convergence Protocol |
| SS7 | Signalling System number 7 |
| TCP/IP | Transmission Control Protocol/Internet Protocol |
| TDMA | Time Division Multiple Access |
| Um | Mobile Station to Network interface |
| UMTS | Universal Mobile Telecommunications Service |
| X.25 | network layer protocol specification |

What is claimed is:

1. A method of operating a mobile radio network in which data is assembled into units by a first convergence protocol layer prior to transmission of the data to a second, peer convergence protocol layer, said data being provided to the first convergence protocol layer by one of a plurality of convergence protocol layer users, the method comprising:

assigning at least one access point identifier to each user; and exchanging between said first and second layers one or more compression control message, each message containing
a data compression/decompression algorithm identifier,
a set of parameters for the identified algorithm, and
identification of at least one access point identifier which is to make use of the identified algorithm.

2. A method according to claim 1, wherein said units of data contain one of said access point identifiers to enable the receiving convergence protocol layer to direct the data contained in the unit to the correct user.

3. A method according to claim 1, wherein said compression control message contains a bitmap of said access point identifiers, where the bitmap indicates those access point identifiers which are to make use of the identified algorithm and those which are not.

4. A method according to claim 3, wherein each of said messages comprise one octet identifying the compression/decompression algorithm, at least one octet containing a bitmap of said access point identifiers, and a plurality of octets containing respective algorithm parameters.

5. A method according to claim 4, wherein said bitmap is contained in two octets.

6. A method according to claim 1, wherein the method forms part of a General Packet Radio Service, and said first and second convergence protocol layers are Subnetwork Dependent Convergence Protocol (SNDCP) layers in a mobile station and in a network, said compression control messages are in the form of exchange identity (XID) messages and said access point identifiers are network service access point identifiers (NSAPIS).

7. A mobile radio device for use in a mobile radio network in which data is assembled into units by a first convergence protocol layer prior to transmission of the data to a second, peer convergence protocol layer, the first convergence protocol layer being in the mobile radio device and the second convergence protocol layer being in the mobile radio network, said data being provided to the first convergence protocol layer by one of a plurality of convergence protocol layer users, each user having assigned to it at least one access point identifier, wherein the mobile radio device is adapted to exchange between its first convergence protocol layer and the second convergence protocol layer of the network one or more compression control message, each message containing a data compression/decompression algorithm identifier, a set of parameters for the identified algorithm, and identification of at least one access point identifier which is to make use of the identified algorithm.

8. A serving general packet radio service (GPRS) support node of a cellular radio network in which data is assembled into units by a first convergence protocol layer prior to transmission of the data to a second, peer convergence protocol layer, the first convergence protocol layer being in the cellular radio network and the second convergence protocol layer being in a mobile radio device, said data being provided to the first convergence protocol layer by one of a plurality of convergence protocol layer users, each user having assigned to it at least one access point identifier, wherein the serving GPRS support node is adapted to exchange between its first convergence protocol layer of the cellular radio network and the second convergence protocol layer of the mobile radio device one or more compression control message, each message containing a data compression/decompression algorithm identifier, a set of parameters for the identified algorithm, and identification of at least one access point identifier which is to make use of the identified algorithm.

* * * * *